(12) United States Patent  
Smith et al.

(10) Patent No.: US 8,633,902 B2
(45) Date of Patent: Jan. 21, 2014

(54) TOUCH INPUT FOR HOSTED APPLICATIONS

(75) Inventors: Joseph Smith, Duvall, WA (US); Sam J. George, Kenmore, WA (US); Stefan Wick, Sammamish, WA (US); Todd A. Torset, Woodinville, WA (US); Jesse Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 12/623,456

(22) Filed: Nov. 23, 2009

(65) Prior Publication Data

US 2011/0122070 A1 May 26, 2011

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| | | | | |
|---|---|---|---|---|
| 5,065,345 A * | 11/1991 | Knowles et al. | ............... | 715/202 |
| 5,379,057 A * | 1/1995 | Clough et al. | ............... | 345/173 |
| 5,781,192 A * | 7/1998 | Kodimer | ..................... | 715/770 |
| 6,392,638 B2 * | 5/2002 | Hanajima et al. | ............ | 345/173 |
| 7,479,949 B2 | 1/2009 | Jobs et al. | | |
| 8,176,428 B2 * | 5/2012 | Tuli | ............................... | 715/738 |
| 8,180,379 B2 * | 5/2012 | Forstall et al. | ............. | 455/456.6 |
| 8,239,784 B2 * | 8/2012 | Hotelling et al. | ............. | 715/830 |
| 2009/0021486 A1 | 1/2009 | Chaudhri et al. | | |
| 2009/0064202 A1 | 3/2009 | Lee et al. | | |
| 2009/0128504 A1 | 5/2009 | Smith | | |
| 2009/0157513 A1 | 6/2009 | Bonev et al. | | |

OTHER PUBLICATIONS

"Multitouch Input", Retrieved at <<http://msdn.microsoft.com/en-us/library/dd894494(VS.95).aspx>>, Aug. 17, 2009, pp. 3.
"Innovative Multi-Touch Solutions: Snowflake Suite 1.6", Retrieved at <<http://natural-ui.com/solutions/software.html>>, Aug. 17, 2009, pp. 6.
Damaraju,Sashikanth, "Creating Models for Learning and Recognizing Multitouch Gestures", Retrieved at <<nuicode.com/attachments/download/95/GSOC.pdf>>, pp. 1-5.

* cited by examiner

*Primary Examiner* — K. Wong

(57) ABSTRACT

A multi-touch plug-in system is described herein that exposes multi-touch data for web application developers to consume in a platform independent way. The multi-touch plug-in system receives platform-specific touch data from an operating system or touch hardware, interprets the platform-specific touch data to convert the platform-specific touch data to generic touch data, and provides the generic touch data to a hosted application running within a plug-in sandbox. Often, sandboxed environments only allow identified, trusted plug-ins to execute. By managing multi-touch data within a trusted plug-in, the plug-in can ensure that hosted applications are properly restricted to well-defined behavior, while still allowing rich features such as multi-touch interaction. Thus, the multi-touch plug-in system brings rich multi-touch interaction to a web browsing environment.

20 Claims, 4 Drawing Sheets

TOUCH INPUT FOR HOSTED APPLICATIONS

BACKGROUND

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world. Other devices also offer similar touch input capabilities, such as touch screen mobile phones.

Multi-touch (or multi-touch) denotes a set of interaction techniques that allow computer users to control graphical applications using multiple fingers or input devices (e.g., a stylus). Multi-touch implementations usually include touch hardware (e.g., a screen, table, wall, and so on) and software that recognizes multiple contemporaneous touch points. Multi-touch stands in contrast to traditional touch screens (e.g., computer touchpad, ATM, shopping kiosk) that only recognize one touch point at a time. Multi-touch hardware can sense touches using heat, finger pressure, high capture rate cameras, infrared light, optic capture, tuned electromagnetic induction, ultrasonic receivers, transducer microphones, laser rangefinders, shadow capture, and other mechanisms. Many applications for multi-touch interfaces exist and application designers and users are proposing even more. As a new input method, multi-touch offers the potential for new user experience paradigms.

An application cannot use multi-touch hardware without an interface for the application software to receive information from the multi-touch hardware. Although newer operating systems, such as Microsoft Windows 7, provide an abstraction layer to receive uniform multi-touch data from many different types of multi-touch hardware, this data is not easily accessible from a web browser and other sandboxed environments. Web browsers often provide isolated or sandboxed environments that strictly control what software (sometimes called a plug-in or control) is allowed to execute on a client computer system. Users have an expectation that using a web browser or other sandbox is a safe experience that will not cause data corruption or other negative impact to their computer system. Newer web applications may make use of feature-rich web plug-ins like Microsoft Silverlight to build rich applications that are nearly or more functional than their desktop counterparts. Unfortunately, sandboxed environments and applications running within them have thus far had difficulty receiving and acting on multi-touch input. This produces a very limited potential market for sandbox application authors and reduces the incentive to write applications supporting multi-touch interactions.

SUMMARY

A multi-touch plug-in system is described herein that exposes multi-touch data for web application developers to consume in a platform independent way. The multi-touch plug-in system receives platform-specific touch data from an operating system or touch hardware. The multi-touch plug-in system interprets the platform-specific touch data to convert the platform-specific touch data to generic touch data. The multi-touch plug-in system provides the generic touch data to a hosted application running within a plug-in sandbox. In some cases, a sandboxed environment only executes identified, trusted plug-ins. By managing multi-touch data within a trusted plug-in, the plug-in can ensure that hosted applications are properly restricted to well-defined behavior, while still allowing rich features such as multi-touch interaction. Thus, the multi-touch plug-in system brings rich multi-touch interaction to a web browsing environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
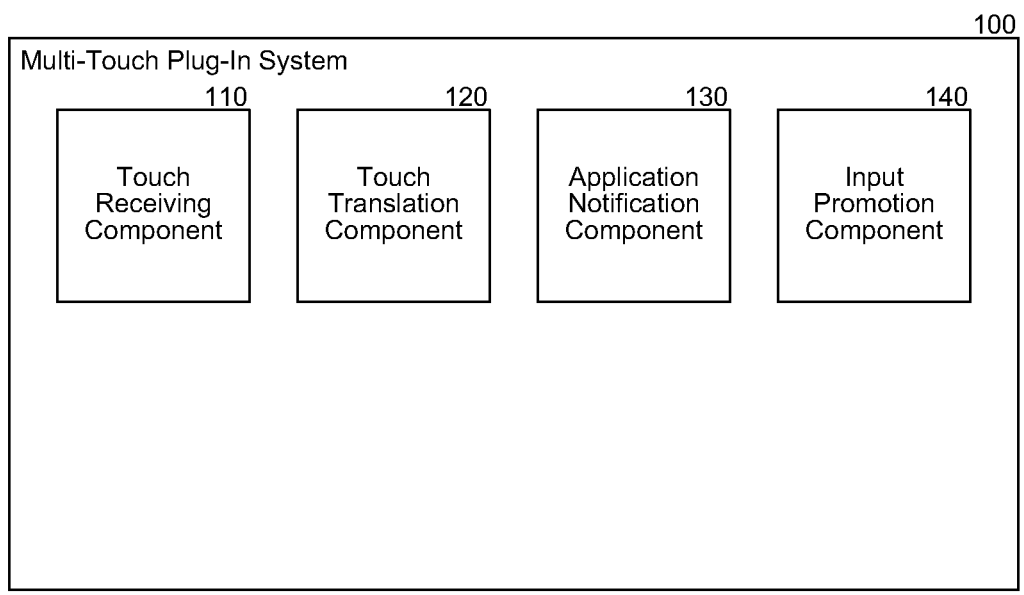
FIG. 1 is a block diagram that illustrates components of the multi-touch plug-in system, in one embodiment.

A multi-touch plug-in system is described herein that exposes multi-touch data for web application developers to consume in a platform independent way. In some embodiments, the multi-touch plug-in system receives platform-specific touch data from an operating system or touch hardware. For example, the operating system may provide one or more application programming interfaces (APIs) that applications, including a web browser, can call to receive touch data. On some platforms, applications may interact with touch hardware directly, such as by invoking one or more APIs for retrieving information from a driver for the hardware. The touch data may include information about coordinates on the screen or touchpad that a user touched, including multiple points representing one or more of the user's fingers or other objects in contact with the touch hardware.

The multi-touch plug-in system interprets the platform-specific touch data to convert the platform-specific touch data to generic touch data. For example, although each platform may represent touch coordinates in a different data structure, the system may convert touch coordinates into a common data structure so that hosted applications do not have to specifically support various touch hardware. The multi-touch plug-in system provides the generic touch data to a hosted application running within a web plug-in sandbox. For example, the hosted application may implement and register an event handler adhering to an interface agreed upon by the sandbox and the hosted application for sharing touch data. One example of a web plug-in sandbox is Microsoft Silverlight. In some cases, a sandboxed environment, such as a web browser, only executes identified, trusted plug-ins. By managing multi-touch data within a trusted plug-in, the plug-in can ensure that hosted applications are properly restricted to well-defined behavior, while still allowing rich features such as multi-touch interaction. Thus, the multi-touch plug-in system brings rich multi-touch interaction to a web browsing environment.

In some embodiments, the multi-touch plug-in system exposes touch input received from an operating system in a platform independent way to a hosted application using a broadcast API mechanism. The broadcast mechanism is a simple and low-cost method of exposing the multi-touch data in a generic way that allows the hosted application a high degree of flexibility about how to handle the data. Following is an example event handler for receiving broadcast touch information.

```
public static class Touch
{
    public static event EventHandler<TouchFrameEventArgs>
    FrameReported;
}
```

The hosted application declares a class like the one above with an event handler for receiving touch data. In this example, "FrameReported" is a broadcast event that is fired globally (as opposed to element scoped) so that the application can handle multi-touch data at a high level. There is data within TouchFrameEventArgs that allows the hosted application to decide whether the application will pass a received multi-touch message on to specific user interface (UI) elements. Following is an example data structure for implementing TouchFrameEventArgs.

```
public sealed class TouchFrameEventArgs : EventArgs
{
    public int Timestamp { get; }
    public TouchPointCollection GetTouchPoints(UIElement relativeTo);
    public TouchPoint GetPrimaryTouchPoint(UIElement relativeTo);
    public void SuspendMousePromotionUntilTouchUp( )
}
```

The class methods GetTouchPoints and GetPrimaryTouchPoint allow the hosted application to indentify which UI elements the multi-touch data intersects with, which the application can then forward handling onto if the application chooses not to handle the data at a global level. SuspendMousePromotionUntilTouchUp( ) instructs the system to suppress touch message to mouse message promotion, described further herein.

Following is an example of how the above event handler and arguments can be used by a hosted application.

```
void ListenToTouch( )
{
    Touch.FrameReported += new
EventHandler<TouchFrameEventArgs>(Touch1_FrameReported);
}
void Touch1_FrameReported(object sender, TouchFrameEventArgs e)
{
    var primaryTouch = e.GetPrimaryTouchPoint(null);
    var primaryDevice = primaryTouch.TouchDevice;
    if (primaryTouch.Action == TouchAction.Down)
    {
        if (CaresAboutTouch(primaryDevice.DirectlyOver))
        {
            e.SuspendMousePromotionUntilTouchUp( );
        }
    }
    TouchPointCollection points =
        e.GetTouchPoints(primaryDevice.DirectlyOver);
    // do gesture manipulation
}
```

The ListenToTouch function registers the Touch1_FrameReported event handler. When the multi-touch plug-in system receives touch data, it calls the registered handler, which invokes the Touch1_FrameReported function. The Touch1_FrameReported function can perform a variety of steps to process touch data and take actions related to the specific hosted application. For example, a photo browsing application may allow a user to rotate and stretch a photo by twisting multiple touch points or moving touch points (e.g., where the user's fingers rest on a touch pad) closer together or farther apart.

FIG. 1 is a block diagram that illustrates components of the multi-touch plug-in system, in one embodiment. The system 100 includes a touch receiving component 110, a touch translation component 120, an application notification component 130, and an input promotion component 140. Each of these components is described in further detail herein.

The touch receiving component 110 receives low-level touch data related to touch hardware. For example, a touch hardware driver or operating system may provide low-level touch data to applications. In some embodiments, the operating system may provide touch data to applications in a message loop via a standardized message. For example, Microsoft Windows applications typically include a message loop that periodically receives information from the operating system to the application. Microsoft Windows 7, for example, provides a WM_TOUCH message that includes information about user interaction with an application through touch hardware. Although applications can receive this message, hosted applications (e.g., web pages and web applications) cannot. Thus, for a hosted application running in a sandboxed environment to receive this message, a trusted plug-in running in the environment, such as Microsoft Silverlight, provides a link between the operating system and hosted applications.

The touch translation component 120 converts low-level touch data into a uniform format for presentation to a hosted application. Web browsers typically operate on multiple platforms and encourage users to assume that common functionality is available regardless of the platform being used. For example, a user visiting the Bing search engine home page expects a similar experience, whether the user is using a Microsoft Windows PC, an Apple computer running Mac OS X, or a Linux-based PC. The user may also expect a similar experience regardless of the browser the user is running. Thus, a plug-in developer may produce a particular plug-in for multiple operating systems and browsers to provide a similar experience on different platforms. With respect to touch data, the type and format of information received varies across various platforms. The touch translation component 120 prevents this variation from being noticed by applications hosted by the plug-in, so that applications will run correctly using the plug-in regardless of the platform on which the plug-in is running. Some platforms may include a list of specific touch points, including coordinates of each of a user's fingers, an indication whether a particular finger changed from up to down (e.g., not contacting versus contacting the touch hardware), and so forth.

The application notification component 130 provides the uniform format touch data to the hosted application for handling by the application. For example, the application notification component 130 may invoke an event handler or other function provided by the hosted application for receiving touch data. Alternatively or additionally, the hosted application may poll the application notification component 130 to determine whether new touch data is available. The application notification component 130 may provide APIs for controlling and configuring the notification process, such as for pausing or turning off notification of new touch data events.

The input promotion component 140 promotes touch input data into non-touch input data. Computer systems often contain multiple forms of input, such as a mouse and keyboard. Certain forms of input, like mouse input, are similar to touch data and are more traditionally expected by applications. For example, a user placing a mouse cursor over an object and clicking the object has a similar effect to a user touching the object using touch hardware. An application may want to handle these types of input in the same code path, or an old application may not understand touch data and only understand mouse input. Thus, the multi-touch plug-in system 100 may allow applications to request that the system 100 promote touch input messages to their closest non-touch equivalent. For example, Microsoft Windows provides many mouse messages, such as WM_MOUSEMOVE, WM_LBUTTON-DOWN, and so forth, and the system may translate WM_TOUCH messages into similar mouse input messages.

In some cases, this behavior can lead to unintended results. For example, when a user is performing a deep zoom, the user may be using a pinching gesture to control the rate of zooming an object, during which time a received promoted mouse message might interfere with the zooming operation. In some embodiments, the multi-touch plug-in system 100 provides an API or other facility for a hosted application to suspend promotion of touch input data. For example, in the example earlier herein, the function SuspendMousePromotionUntil-TouchUp is called by the example event handler to prevent mouse promotion until the user lifts the current finger or set of touch points from the touch hardware (e.g., when the user is finished with the current touch gesture).

The computing device on which the multi-touch plug-in system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
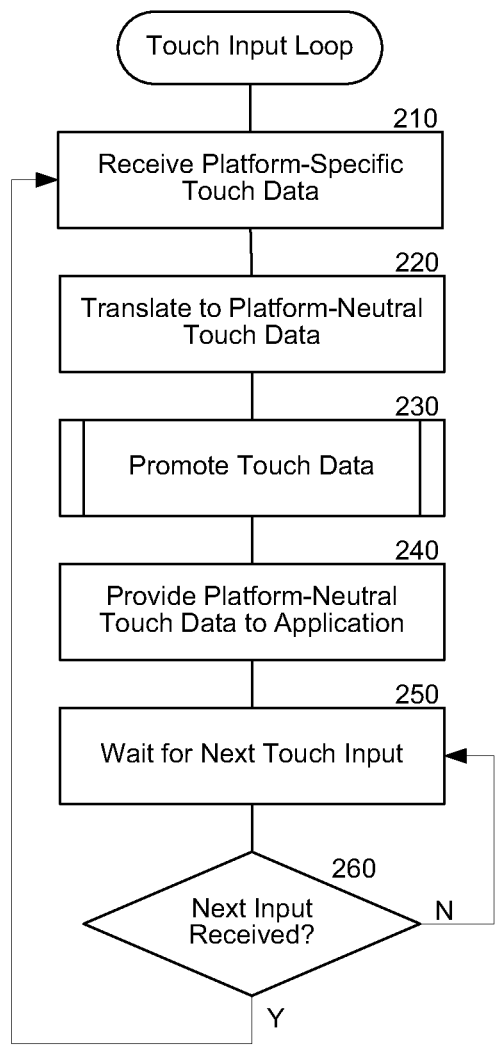
FIG. 2 is a flow diagram that illustrates processing of the multi-touch plug-in system to provide touch data to a hosted application, in one embodiment.

FIG. 2 is a flow diagram that illustrates processing of the multi-touch plug-in system to provide touch data to a hosted application, in one embodiment. Beginning in block 210, the system receives platform-specific touch data provided to a plug-in from a platform on which a sandboxed environment is running. For example, the system may receive operating system provided touch data from an operating system that supports touch input. The platform-specific touch data may include elements related to the operating system or other nuances specific to the platform. Continuing in block 220, the system translates the received platform-specific touch data into a platform-neutral format common to multiple platforms on which the plug-in operates. For example, the system may format the platform-specific touch data into a plug-in defined data structure that is well known to applications made to be hosted by the plug-in. The system may remove touch information related to a single platform or convert the information into common touch information that can be received from multiple platforms.

Continuing in block 230, the system optionally promotes the received touch data into related non-touch input data. For example, the system may convert touch data into mouse messages understood by a wide variety of applications for backwards compatibility. This block is described further with reference to FIG. 3. Continuing in block 240, the system provides the translated platform-neutral touch data to an application hosted by the plug-in. For example, the system may notify an event handler of the hosted application for each unit of touch data received from the underlying platform. The notification may include information, such as via parameters to the event handler, that further describes the type of touch input received by touch hardware. For example, the information may include virtual coordinates of one or more points that correspond to locations the touch hardware identified touch input.

Continuing in block 250, the system waits for the next touch input from the platform. The system may repeat these steps in a loop each time touch data is received for as long as the hosted application or plug-in is running. Continuing in decision block 260, if the system receives new touch input, then the system loops to block 210 to process the new touch input, else the system loops to block 250 to continue waiting for new touch input. After block 260, these steps conclude.

Figure 3:
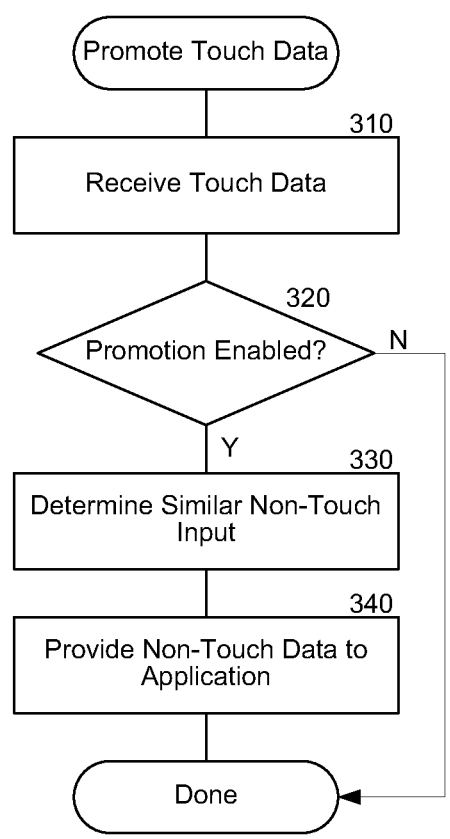
FIG. 3 is a flow diagram that illustrates processing of the input promotion component to convert touch data to non-touch data, in one embodiment.

FIG. 3 is a flow diagram that illustrates processing of the input promotion component to convert touch data to non-touch data, in one embodiment. Beginning in block 310, the component receives touch data that describes touch input received by touch hardware. For example, a user may touch a touch screen with each of the fingers of one hand and the touch data may include coordinates of the five points related to a location of each of the user's fingers on the touch screen. Continuing in decision block 320, the component determines whether touch promotion is currently enabled. If touch promotion is currently enabled, then the component continues at block 330 to convert the touch data to non-touch data, else the component completes without converting the touch data.

Continuing in block 330, the component determines a similar non-touch input related to the received touch data. For example, if the user placed a finger over an on-screen object, then the component may determine that a mouse click at the touched location is an equivalent or similar mouse input. Continuing in block 340, the component provides the determined non-touch data to an application for handling. For example, the component may provide a mouse button click message (e.g., WM_LBUTTONDOWN using Microsoft Windows) to the application in place of or in addition to a touch message identifying a touched object or location. After block 340, these steps conclude.

Figure 4:
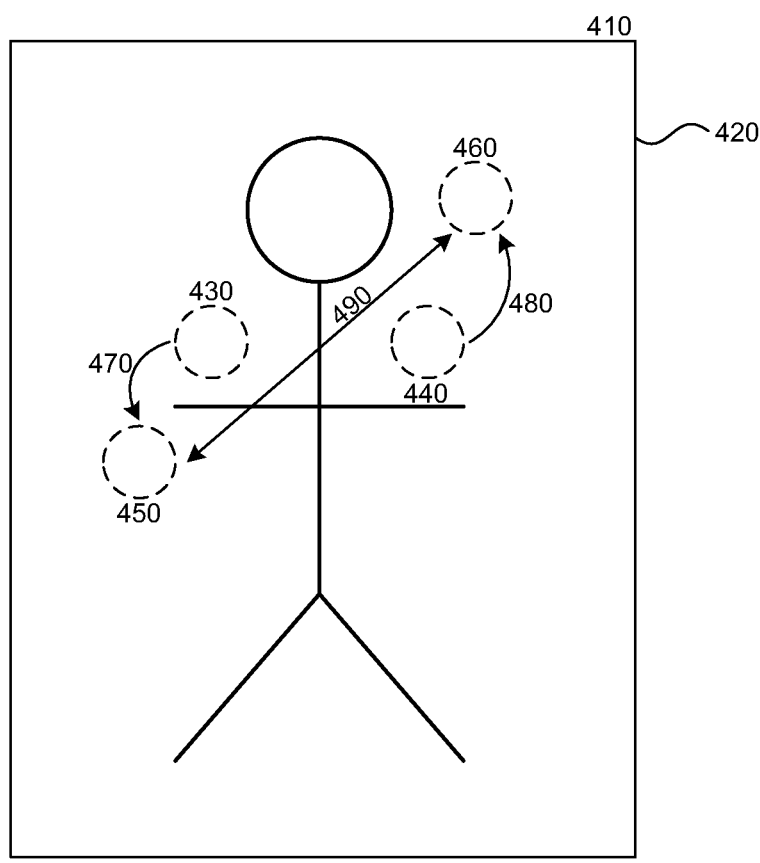
FIG. 4 is a display diagram that illustrates an application object manipulated by touch input, in one embodiment.

FIG. 4 is a display diagram that illustrates an application object manipulated by touch input, in one embodiment. An application may simultaneously display and receive touch input for many such objects. For example, the objects may represent one or more photographs stored on the user's computer. The object 410 has a boundary 420 defined by the application based on the application's particular domain. For example, a photo browsing application may have objects that represent user photos and the application may define the edge of each displayed photo as an object boundary 420. A user touches the object with two initial contacts at locations 430 and 440. For example, the user may set his/her thumb at location 430 and index finger at location 440. Then, the user rotates his/her fingers and moves them apart, such that the contacts end at locations 450 and 460. The lines 470 and 480 illustrate the approximate rotation performed by the user's movement. The line 490 illustrates the approximate stretching performed by the user's movement. Rather than provide the individual coordinates of the touch contacts 430-460, the system can indicate to the application the gestures performed by the user, such as the degree of rotation and the scale factor related to the stretching.

In some embodiments, the multi-touch plug-in system automatically promotes touch data to mouse messages for backwards compatibility. As described further herein, older applications may not be designed to receive touch data but are typically designed to receive mouse input. The system can often translate touch data into similar mouse input and may do so to allow older applications to receive touch input. In some cases, this may produce undesirable behavior, so the system may also allow configuring (e.g., disabling) the automatic promotion of touch data to legacy input.

In some embodiments, the multi-touch plug-in system determines whether to provide touch data based on whether an application registers to receive touch data. For example, the system may provide touch data promoted to mouse messages to an application unless the application requests to receive touch data specifically. The system may also provide interpreted touch data, such as gestures, without providing native touch data. For example, Microsoft Windows 7 provides a WM_GESTURE message that conveys user touch input conforming to several common gestures (e.g., rotate and pan). Applications that want to receive more specific touch data, such as coordinates and touch points of each touch input object (e.g., a user finger) can register to do so as described herein. For other applications, the system may select a default set of input to provide to the application to ensure that the application can properly handle the types of input the application receives.

In some embodiments, the multi-touch plug-in system may provide different touch behavior to hosted applications when a web plug-in is running in a windowed mode versus a windowless mode. Applications running in a windowless mode typically expect the browser to render the application directly, instead of giving the plug-in its own window for rendering. One reason to use windowless mode is to blend application content with Hypertext Markup Language (HTML) content on a web page, which the browser can do only when it is in charge of all the rendering. With windowless mode, an application can layer application content on top of HTML content and HTML content on top of application content. For example, an application may want to display a map using HTML, but add a layer that uses vector graphics from a plug-in to highlight certain features of the map. The overlay scenario works well for simple situations, but when the browser has the responsibility of rendering the application content directly, there are numerous things that it cannot do (or cannot do well). Furthermore, some of the limitations depend on which browser is doing the rendering. Thus, the system may provide more limited touch data or no touch data at all in windowless mode, while providing full touch capabilities in windowed mode.

In some embodiments, the multi-touch plug-in system provides element-scoped touch notification. Although some of the touch data described herein is provided to hosted applications as a global-scope notification that touch data was received, the system can also include element-scoped touch data. As an example, if a hosted application includes three controls, and a user touches one of the controls, the system may notify only the touched control that a touch was received. This is element-scoped notification because only the touched element (or its children) receive the touch notification. Alternatively or additionally, the system can provide global-scope notification wherein a global event handler or other function receives notification whenever any element (or all elements within a particular area, such as a window) is touched.

In some embodiments, the sandboxed environment includes an application run outside of a web browser. For example, Microsoft Silverlight provides a standalone application mode that allows Microsoft Silverlight applications to run in a standalone application that is not associated with a browser. The standalone application may provide restrictions on the APIs and other underlying platform features that applications running within the sandbox can use.

From the foregoing, it will be appreciated that specific embodiments of the multi-touch plug-in system have been described herein for purposes of illustration, but that various modifications may be made without deviating from the spirit and scope of the invention. Accordingly, the invention is not limited except as by the appended claims.

We claim:

1. A computer-implemented method for processing multi-touch data in hosted environment, the method comprising:
receiving platform-specific touch data provided to a hosted plug-in from a platform on which a sandboxed environment is running;
translating the received platform-specific touch data into a platform-neutral format common to multiple platforms on which the plug-in operates; and
providing the translated platform-neutral touch data to an application hosted by the plug-in,
wherein the preceding steps are performed by at least one processor.

2. The method of claim 1 wherein receiving platform-specific touch data comprises receiving operating system provided touch data from an operating system that supports touch input.

3. The method of claim 1 wherein translating the received platform-specific touch data comprises formatting the platform-specific touch data into a plug-in defined data structure that is well-known to applications made to be hosted by the plug-in.

4. The method of claim 1 further comprising promoting the received touch data into related non-touch input data.

5. The method of claim 4 wherein the non-touch input data comprises mouse messages related to the touch data.

6. The method of claim 1 wherein providing the translated platform-neutral touch data comprises notifying an event handler of the hosted application.

7. The method of claim 1 wherein the translated platform-neutral touch data comprises information that identifies a type of touch input received by touch hardware.

8. The method of claim 1 wherein the translated platform-neutral touch data comprises virtual coordinates of one or more points that correspond to locations at which touch hardware identified touch input.

9. The method of claim 1 further comprising repeating the receiving, translating, and providing steps for each unit of touch input while the hosted environment is running.

10. The method of claim 1 wherein providing the translated platform-neutral touch data comprises identifying a control to which the touch data is related.

11. A computer system for providing touch input to a hosted application, the system comprising:
    a memory in which software instructions are stored; and
    a processor coupled to the memory and configured to execute the software instructions to provide the touch input data to the hosted application;
    wherein the software instructions comprise:
        a touch receiving component configured to receive low-level touch data related to touch hardware;
        a touch translation component configured to convert received low-level touch data into a uniform format for presentation to the hosted application; and
        an application notification component configured to provide the uniform format touch data to the hosted application for handling by the application.

12. The system of claim 11 wherein the touch receiving component is further configured to invoke an operating system application programming interface to receive touch data.

13. The system of claim 11 wherein the touch receiving component is further configured to invoke a driver associated with touch hardware to receive touch data.

14. The system of claim 11 wherein the touch translation component is further configured to mask differences in touch data provided by multiple platforms by converting the differences into the uniform format.

15. The system of claim 11 wherein the touch translation component is further configured to allow hosted applications to run correctly using the system regardless of the platform on which the system is running.

16. The system of claim 11 wherein the application notification component is further configured to invoke an event handler provided by the hosted application for receiving touch data.

17. The system of claim 11 further comprising an input promotion component configured to promote touch input data into non-touch input data for backwards compatibility with hosted applications that do not handle touch data.

18. The system of claim 17 wherein the input promotion component is further configured to provide an application programming interface for enabling and disabling input promotion.

19. A computer-readable storage medium comprising instructions for controlling a computer system to convert touch input data to non-touch input data, wherein the instructions, when executed, cause a processor to perform actions comprising:
    receiving touch input data that describes touch input received by touch hardware;
    determining whether touch promotion is currently enabled;
    if touch promotion is currently enabled,
        determining non-touch data related to the received touch data; and
        providing the determined non-touch data to an a hosted application that does not handle touch data so that the hosted application can handle the related non-touch data, wherein a hosted application is an application running within a plug-in sandbox.

20. The medium of claim 19 wherein determining whether touch promotion is currently enabled comprises determining whether a hosted application has invoked an application programming interface to disable touch promotion.

* * * * *